US007876944B2

(12) United States Patent
Stalling et al.

(10) Patent No.: US 7,876,944 B2
(45) Date of Patent: Jan. 25, 2011

(54) METHOD AND APPARATUS FOR RECONSTRUCTION OF 3D IMAGE VOLUMES FROM PROJECTION IMAGES

(75) Inventors: Detlev Stalling, Berlin (DE); Malte Westerhoff, Berlin (DE); Martin Seebass, Munich (DE); Ralf Kubis, Berlin (DE)

(73) Assignee: PME IP Australia Pty Ltd., Richmond, Victoria (AU)

( * ) Notice: Subject to any disclaimer, the term of this patent is extended or adjusted under 35 U.S.C. 154(b) by 0 days.

(21) Appl. No.: 12/725,452

(22) Filed: Mar. 17, 2010

(65) Prior Publication Data

US 2010/0215240 A1    Aug. 26, 2010

Related U.S. Application Data

(60) Division of application No. 11/263,568, filed on Oct. 31, 2005, now Pat. No. 7,693,318, and a continuation-in-part of application No. 10/756,172, filed on Jan. 12, 2004, now Pat. No. 7,120,283.

(60) Provisional application No. 60/623,410, filed on Oct. 29, 2004.

(51) Int. Cl.
*G06K 9/00* (2006.01)
*G01N 23/00* (2006.01)
(52) U.S. Cl. .................... 382/128; 382/285; 378/4; 378/21; 128/922
(58) Field of Classification Search ................ 382/128, 382/131, 132, 285, 293; 378/4, 10, 21, 23; 128/922
See application file for complete search history.

(56) References Cited

U.S. PATENT DOCUMENTS 5,744,802 A *  4/1998  Muehllehner et al. .. 250/363.03
6,470,070 B2 * 10/2002  Menhardt ................ 378/62

OTHER PUBLICATIONS

Mueller et al., IEEE Publication, 2000, "Rapid 3-D cone beam reconstruction with the simultaneous algebraic reconstruction technique (SART) using 2-D texture mapping hardware" (pp. 1227-1237).*

* cited by examiner

*Primary Examiner*—Manav Seth
(74) *Attorney, Agent, or Firm*—Vierra Magen Marcus & DeNiro LLP

(57) ABSTRACT

The invention provides improvements in reconstructive imaging of the type in which a volume is reconstructed from a series of measured projection images (or other two-dimensional representations) by utilizing the capabilities of graphics processing units (GPUs). In one aspect, the invention configures a GPU to reconstruct a volume by initializing an estimated density distribution of that volume to arbitrary values in a three-dimensional voxel-based matrix and, then, determining the actual density distribution iteratively by, for each of the measured projections, (a) forward-projecting the estimated volume computationally and comparing the forward-projection with the measured projection, (b) generating a correction term for each pixel in the forward-projection based on that comparison, and (c) back-projecting the correction term for each pixel in the forward-projection onto all voxels of the volume that were mapped into that pixel in the forward-projection.

13 Claims, 4 Drawing Sheets

METHOD AND APPARATUS FOR RECONSTRUCTION OF 3D IMAGE VOLUMES FROM PROJECTION IMAGES

CLAIM OF PRIORITY

The present invention is a divisional application of U.S. patent application Ser. No. 11/263,568, filed on Oct. 31, 2005, entitled "Method and Apparatus for Reconstruction of 3D Image Volumes from Projection Images," which claims priority to a U.S. Provisional Patent Application No. 60/623,410, filed on Oct. 29, 2004, entitled "Method and Apparatus for Reconstruction of 3D-Image Volumes from Projection Images." U.S. patent application Ser. No. 11/263,568 also claims priority, as a continuation-in-part (CIP) application, to a U.S. patent application entitled "Improved Methods and Apparatus for Back-Projection and Forward-Projection," filed Jan. 12, 2004 and having a Ser. No. 10/756,172. All three of the above-cited patent applications are incorporated herein by reference in their entirety.

BACKGROUND OF THE INVENTION

The invention relates generally to digital data processing and, particularly, to reconstructive imaging. The invention has application in heath care and, specifically, medical imaging—as well as in a host of other areas, such as industry, research and defense.

Reconstructive imaging—that is, the construction of a three-dimensional representation (image) of a volume from two-dimensional measured projection images of that volume, e.g., obtained by an x-ray imaging apparatus—is highly computation intensive. For example, computed axial tomography (CAT) is an imaging technique in which three-dimensional views of the internal structures of an object—typically, a head or other portion of the human body—are constructed from a series of x-ray projections (or scans) taken at a plurality of angles around the object.

With the aid of a computer, those scans can be computationally transformed (e.g., using techniques such as back-projection) to discern the internal structures of the object (e.g., in the case of a head, the skull, gray matter and other imageable structures). While none of those transformations is, in itself, sufficient to identify those structures, the computational combination of all of the transformations typically is. Because this requires processing hundreds, if not thousands, of projected images, it typically requires special-purpose hardware in order to provide real-time results. Though prior art solutions have proven effective in this regard, they are typically quite expensive.

Moreover, many prior solutions—particularly, for example, those, for determining back-projections have limited applicability to a new class of imaging, referred to as tomosynthesis, in which a relatively small number of projection images are required from only a limited number of x-ray source positions (or foci). In these systems, the computational transformations include not only back-projections, but also forward-projections, in which estimates of the volume being reconstructed are projected "forward" to generate hypothetical (synthetic) projection images for computational comparison with actual measured projection images acquired by the imaging equipment. By comparing the hypothetical forward projection of the current 3D model to the measured projection images, a correction image can be calculated and used to update (modify) the current 3D model.

CAT scanners and tomosynthesis systems are not the only medical imaging equipment that use forward-projections and/or back-projections. Forward-projection and back-projection operations also form the basis of a broader class of computer-based imaging techniques, referred to as computed tomography (CT), as well as positron emission tomography (PET), single photon emission computed tomography (SPECT), to name but a few. In addition, forward-projection and back-projection are used outside the medical field, for example, in manufacturing (e.g., to inspect articles for defects), securing (such as baggage scanning) in research, defense and so forth.

An object of the invention is to provide improved digital data processing apparatus and methods. Another object is to provide such apparatus and method as can be applied to reconstructing images, e.g., of the type discussed above (by way of non-limiting example).

Other objects of the invention are to provide such apparatus and methods that can perform reconstructive imaging more efficiently. Another object of the invention is to provide such methods and apparatus that can be implemented with less expensive equipment, off-the-shelf or otherwise.

SUMMARY

The above objects are among those attained by the invention, which provides improvements in reconstructive imaging and, specifically, in determining the density distribution of a volume from a set of measured projection images of that volume recorded with a known recording geometry. These have application in health care, including, medical imaging (e.g., in computed axial tomography (CAT), magnetic resonance imaging (MRI), positron emission tomography (PET), single photon emission computed tomography (SPECT), and other computed tomography applications, to name but a few), as well as in industry, research, and defense, among other areas.

In one aspect, the invention employs the capabilities of chips or chip sets, boards and/or processor configurations known "graphics processing units" (GPUs) to reconstruct a volume by initializing to arbitrary values the volume density distribution in a voxel matrix representing an estimate of that volume and, then, determining the actual density distribution iteratively by, for each of the measured projections, (a) forward-projecting the estimated volume computationally and comparing the forward-projection with the measured projection, (b) generating a correction term for each pixel in the forward-projection based on that comparison, and (c) back-projecting the correction term for each pixel in the forward-projection onto all voxels of the volume that were mapped into that pixel.

A related aspect of the invention provides an improvement in an apparatus for computed tomography of the type that reconstructs density distribution of a volume from a plurality of measured projection images. The improvement comprises using a graphics processing unit (GPU) including a plurality of programmable vertex shaders that are coupled to a plurality of programmable pixel shaders to reconstruct the volume. More particularly, the vertex shaders and the pixel shaders are adapted to generate, for at least one projection image of a volume, a respective forward-projection image of an estimated density distribution assigned to that volume. They then generate one or more correction terms based on comparison of one or more pixels in the forward-projection image with respective pixels in the measured projection image. At least one of the pixel shaders back-projects each correction term associated with one of the pixels in the forward-projection image to voxels in the estimated volume that are mapped to that pixel. In this manner, an updated estimated volume density distribution is generated to which the above steps of forward-projection, correction terms generation, and back-projection can be iteratively applied. The iterative process is terminated when the estimated volume density is deemed sufficiently close to the actual density distribution (e.g., when a predefined convergence criterion is met).

In further aspects of the invention, the volume being reconstructed is represented (partitioned) as a plurality of slices and one or more of the vertex shaders are configured to map to each pixel in the forward-projection image a plurality of voxels that lie substantially at vertices of one or more selected polygonal portions of those slices. Those vertex shaders can provide the mappings by treating each forward-projection image as a "window" and each of the polygonal portions as a "model" being projected onto the window.

In a related aspect, one or more of the pixel shaders compute an intensity for each pixel in a forward-projection image as a summation of projections of those voxels in the estimated volume that are mapped to that pixel. To this end, at least one of the pixel shaders computes multiple forward-projection steps along a ray, which extends from the source through the volume to a pixel in the forward-projection image, prior to computing corresponding steps along another ray.

In another aspect of the invention, at least one of the pixel shaders generates correction terms for one or more pixels in the forward-projection image based on comparison of the intensities of those pixels with the intensities of the respective pixels in a corresponding measured projection image. The pixel shader, then, back-projects each correction term to voxels in the estimated volume that are mapped to a pixel associated with that term. In some cases, the pixel shader utilizes a windowing function to weight a correction term along one or more back-projected rays. The weights applied to the back-projected correction terms can be computed by one or more of the pixel shaders, or via look-up in a 1-D texture.

In further aspects, the GPU classifies the measured projection images into two groups characterized by substantially orthogonal projection directions. For example, the projection directions associated with one group can be substantially along the x-axis while those of the other group are substantially along the y-axis. The GPU processes the measured projection images in one group (i.e., compares the projection image with a respective synthetic forward-projection image, generates correction terms based on that comparison and back-projects the correction terms to the volume) prior to processing the measured projection images in the other group. In some cases, the GPU processes the measured projection images in at least of the groups according to a quasi-random sequence.

In other aspects, the reconstruction volume comprises an intersection of cone beams corresponding to the projection images (a cone beam is a collection of a rays comprising a central ray and a plurality of diverging rays surrounding the central ray in a cone-like configuration that travel from a source to a detector through a volume, to form a projection image of that volume).

Further related aspects of the invention provide an imaging apparatus that includes an image acquisition device for generating a plurality of measured projection images of a volume, and a digital data processor coupled to the acquisition device for receiving those images. The digital data processor comprises a central processing unit (CPU) that is in communication with a graphics processing unit (GPU), which includes a plurality of programmable vertex shaders coupled to a plurality of programmable pixel shaders. The CPU causes the transfer of at least some of the measured projection images to the GPU. The GPU, in turn, reconstructs at least a portion of the volume based on comparison of a plurality of forward-projection images corresponding to successive iterations of an estimated density distribution assigned to that volume portion with one or more of the measured projection images without transfer of intermediate texture data to the CPU.

In another aspect, in the above imaging apparatus, the acquisition device comprises a radiation source for illuminating the volume and at least one detector movable about the volume for detecting at least a portion of the illuminating radiation that passes through the volume.

In a related aspect, one or more pixel shaders generate each forward-projection image by employing a projection matrix that represents an asymmetric view frustum, where the view frustum is defined by the origin of the radiation source and four corners of a plane of the detector.

Further related aspects of the invention provide a method for reconstructing a volume from a plurality of measured projection images in an apparatus that comprises a main processing section and a graphics coprocessing section, which includes a plurality of programmable vertex shaders that are coupled to a plurality of programmable pixel shaders. The method comprises transferring the projection images from the main processing section to the graphics coprocessing section, and iteratively reconstructing the volume in the graphics processing section based on comparison of a plurality of forward-projection images corresponding to successive iterations of an estimated density distribution assigned to that volume with the measured projection images, without transfer of intermediate texture data between the graphics coprocessing section and the main processing section.

In a related aspect of the invention, in the above method, each forward-projection image is generated by performing the following steps: with one or more the vertex shaders, a plurality of voxels that substantially lie at vertices of selected polygonal section of one or more slices into which the volume partitioned are mapped to a respective pixel of that forward-projection image; and with one or more of the pixel shaders, an intensity for each pixel in the forward-projection image is generated by forward-projecting the voxels mapped to that pixel.

These and other aspects of the invention are evident in the drawings and in the description that follows.

BRIEF DESCRIPTION OF THE DRAWINGS

A more complete understanding of the invention may be attained by reference to the drawings in which.

DETAILED DESCRIPTION OF THE ILLUSTRATED EMBODIMENTS

Described below are methods and apparatus for reconstruction of three-dimensional volumetric representations, e.g., from a plurality of two-dimensional measured projection images. The illustrated embodiments employ the capabilities of chips and chip sets, boards and/or processor configurations known as "graphics processing units" (GPUs) to more efficiently process measured projection images of a volume to reconstruct a density distribution associated with that volume, though the methods and apparatus described herein may be implemented on general purpose processors, special purpose processors. Still other embodiments use no GPU at all, relying on the CPU and/or other co-processing functionality (such as floating point units, array processors, and so forth) to provide or supplement such processing, all in accord with the teachings hereof.

The invention has application, for example, in medical imaging such as computed tomography (CT), position emission tomography (PET), single photon emission computed tomography (SPECT), and other medical applications.

Figure 1:
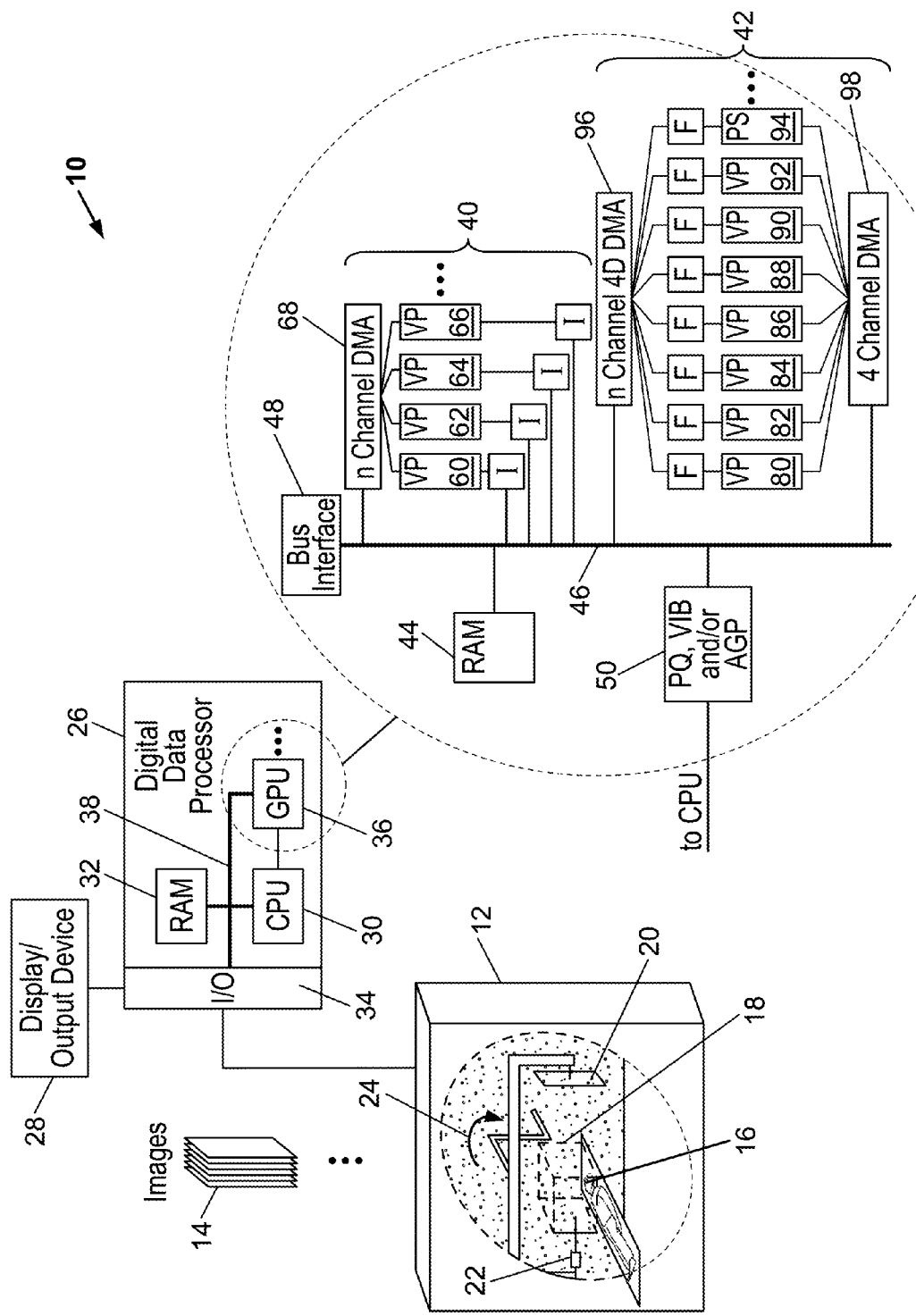
FIG. 1 depicts a computer aided tomography system 10 according to one practice of the invention.

Turning to the illustrated embodiment, FIG. 1 depicts a computer aided tomography system 10 according to one practice of the invention. The system 10 includes an image acquisition apparatus 12 that generates multiple projection images 14 of an object 16 in a volume 18. In the illustrated embodiment, this is accomplished in the conventional manner, e.g., by illuminating the object 16 with radiation from a source 22 and detecting by a detector 20, such as a charged-coupled device or other 2D sensor array, radiation not absorbed by the object 16. Generally, multiple projection images obtained at different respective angles are required for reconstructing a three-dimensional representation of the object. Such projection images can be captured by moving the source and/or the detector around the volume 16 to illuminate the object from different angles and to detect a portion of the illuminating radiation that is not absorbed by the object.

In one embodiment, those projections are generated in accord with the principles of computed tomography (CT), i.e., with the source 22 at discrete foci on an arc 24 that completely surrounds the volume 18. In another embodiment, those projections are generated in accord with principles of computed tomosynthesis, i.e., with the source 22 at discrete foci along a smaller arc above the object. In some embodiments, the radiation source is an x-ray source and the detector 22 is an x-ray detector, both mounted at opposite ends of a C-arm that rotates about the volume 18. The rotatable C-arm is a support structure that allows rotating the source 22 and the detector 20 around the volume 18, e.g., a long a substantially circular arc, to capture a plurality of projection images of the object 16 at different angels. It should, however, be understood that the teachings of the invention can be applied to a plurality of measured projection images regardless of the implementation of the apparatus that generates those projection images.

In view thereof and without loss of generality vis-à-vis these other apparatus with which the invention has application, the apparatus 12 is referred to hereafter as a CAT scanner, its attendant source 20 and detector 22 are referred to as an x-ray source and an x-ray detector, respectively, and the images 14 generated by the detector are referred to as projections.

Figure 2A:
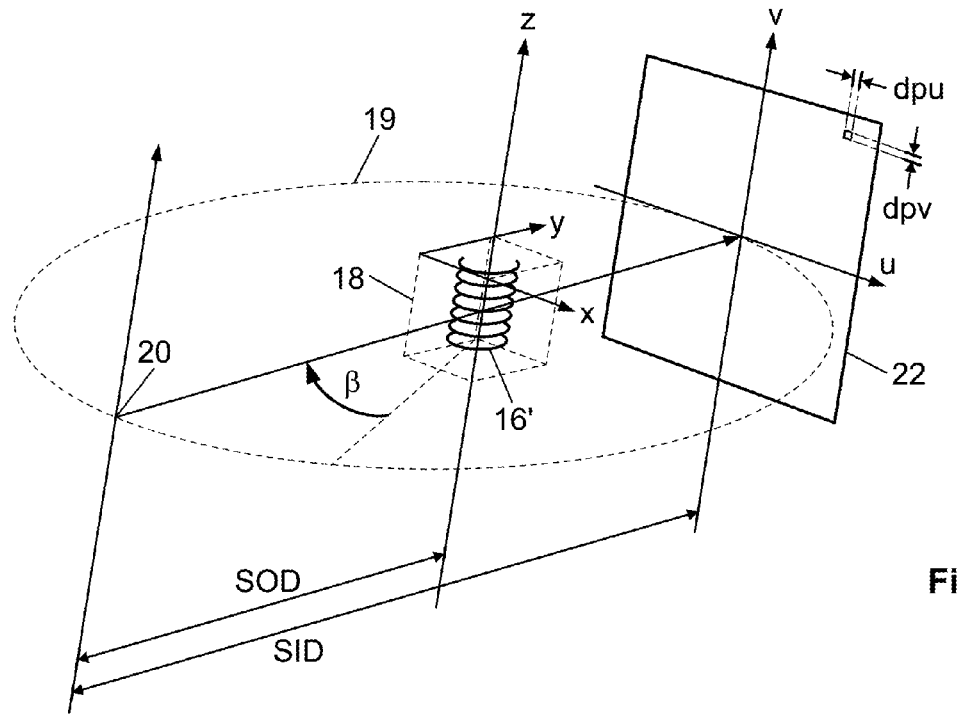
FIGS. 2A and 2B schematically depict generation of a measured projection image of a volume containing a rib cage in a tomography system of the type shown in FIG. 1.
Figure 2B:
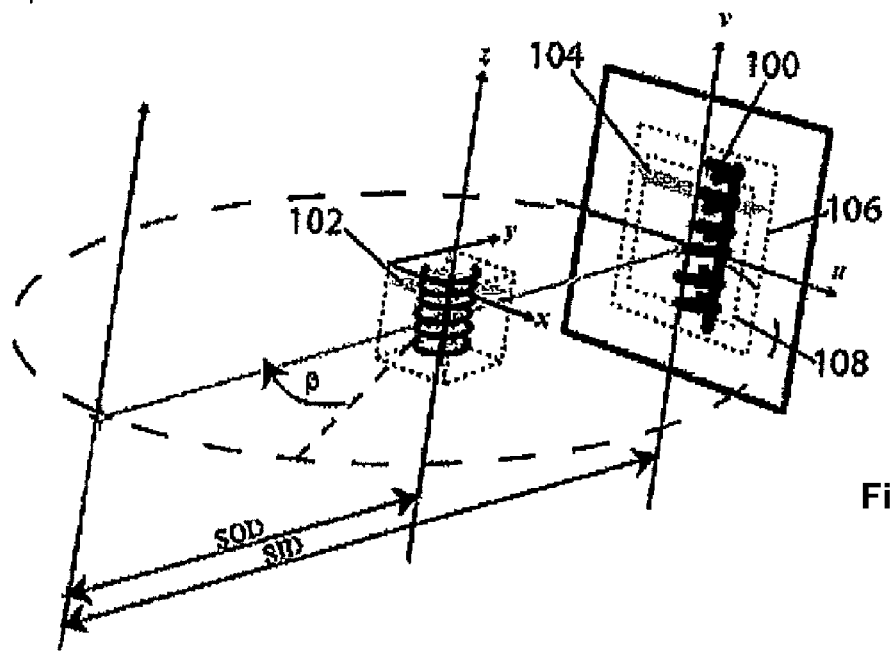

By way of illustration, FIGS. 2A and 2B schematically depict generation of a measured projection image by apparatus 12 of a volume 18 containing a rib cage 16'. X-ray radiation emitted by the source 20, shown at one of its axial positions $\beta$ as it rotates about the volume 18 during a scanning operation, travel through the imaged volume 18. A portion of the x-ray radiation not absorbed by the imaged volume impinges on the detector array 22, depicted opposite source 20 vis-à-vis the volume 18, as the detector moves about the volume 18 in tandem with the source. The volume 18 is characterized by x, y and z axes, as indicated, and the detector 22 and, specifically, the imaging portion thereof, is characterized by u and v axes defining an imaging or detection plane that is parallel to the axis of rotation (i.e., the z-axis) and has a normal perpendicular to a tangent of the rotational path 19. Referring to FIG. 2B, the imaging arrangement of FIG. 2A is shown with the additional superposition on detector 22 of an image 100 of the type generated by projection of x-ray radiation from the source 20 through the rib cage 16'. As evident in the drawing, the image 100 is a silhouette or, as more often referred to herein, a "projection" or a "projection image," e.g., in the nature of a conventional x-ray image.

Referring again to FIG. 1, the system 10 further includes a digital data processor 26 that analyzes the images 14 to "reconstruct" the volume 18—and, more specifically, to generate a three-dimensional representation of the contents of that volume, e.g., the object 16, (or a portion thereof) in a manner discussed in more detail below. Illustrated object 16 is the head of a human patient. However, the invention can be used in analyzing images of other objects, biological, archeological, industrial, or otherwise.

Illustrated digital data processor 26 is a workstation, personal computer, mainframe, or other general or special-purpose computing device of the type conventionally known in the art, albeit adapted as discussed below for processing projections 14. As shown in the drawing, it includes a central processing unit (CPU) 30, dynamic memory (RAM) 32, and I/O section 34, all of the type conventionally known the art. The digital data processor 26 may be coupled, via I/O section 34, with a monitor or other graphical display or presentation device 28, as shown.

Illustrated digital data processor 26 also includes a graphical processing unit (GPU) 36 that is coupled to the CPU 30, through which it can access the other elements of the digital data processor 26, as shown. The GPU 36 serves, in the illustrated embodiment, as a coprocessor, operating under the control of the CPU 30 to iteratively reconstruct the volume 18 from the measured projection images in accord with the teachings of the invention, as discussed in more detail below. Other embodiments of the invention employ multiple GPUs for this purpose, each responsible for a respective portion of the reconstruction process. The GPU 30 is preferably of the variety having programmable vertex shaders and programmable pixel shaders that are commercially available from ATI research (for example, the Radeon™ 9700 processor), NVIDIA (for example, the GeForce™ FX and Quadro® processors). However, it will be appreciated that the invention can be practiced with processing elements other than commercially available GPUs. Thus, for example, it can be practiced with commercial, proprietary or other chips, chipsets, boards and/or processor configurations that are architected in the manner of the GPUs (e.g., as described below). It can also be practiced on such chips, chipsets, boards and/or processor configurations that, though of other architectures, are operated in the manner of GPUs described herein.

Components of the digital data processor 26 are coupled for communication with one another in the conventional manner known in the art. Thus, for example, a PCI or other bus 38 or backplane (industry standard or otherwise) may be provided to support communications, data transfer and other signaling between the components 30-36. Additional coupling may be provided among and between the components in the conventional manner known in the art or otherwise.

A typical architecture of the GPU 36 suitable for use in the practice of the invention is shown by way of expansion graphic in FIG. 1. The GPU 36 includes a geometrical mapping section 40 and a pixel processing section 42 interconnected with one another, as well as with a local memory 44, by way of a bus 46. The GPU communicates with other components of the digital data processor by interfacing with the bus 38 via a bus interface 48. A further interface 50 is provided between the bus 46 and the CPU 30 by way of one or more interfaces of the type standard in the art, or otherwise, for CPU/GPU intercommunication. In the illustrated embodiment, that further interface 50 is a VIP (video input port) interface, and AGP (accelerated graphics port) interface or otherwise, as conventionally known in the art or otherwise.

Local memory 44 supports both the short-term and long-term storage requirements of the GPU 36. For example, it can be employed to buffer the projection image data 14, iterative estimates of the density distribution of the volume under reconstruction, forward-projection images generated based on those estimates as well as parameters, constants and other information (including programming instructions for the vector processors that make up the mapping and pixel processing sections).

In the illustrated embodiment, the mapping section 40 comprises a plurality of programmable vertex shaders 60-66 that generate mappings between the coordinate space of the projection images and that of the volume 18. For example, the vertex shaders map each pixel in a projection image to one or more voxels in the volume. The pixel processing section comprises a plurality of pixel shaders 80-94 that can adjust pixel intensities in forward-projection images generated from estimates of the density distributions of the volume, e.g., based on comparison of the forward-projection images with respective measured projection images, and to modify density values of voxels in the volume to reflect back-projection of those forward-projection images, as discussed in more detail below.

DMA engines 68 and 96 provide coupling between the local bus 46 and, respectively, the vertex shaders 60-66 and pixel shaders 80-94, facilitating access by those elements to local memory 44, interfaces 48, 50, or otherwise. A further DMS engine 98 provides additional coupling between the pixel shaders 80-94 and the bus 46. In addition, filters (labeled "F") are coupled between the DMA engine 96 and the pixel shaders 80-94, as illustrated. These perform interpolation, anisotropic filtering or other desired functions. Also coupled to the vertex shaders 60-66 are respective iterators (labeled "I"), as illustrated. Each iterator generates addresses (in volume space) for the voxels defined by the corresponding vertex shaders 60-66.

Figure 3:
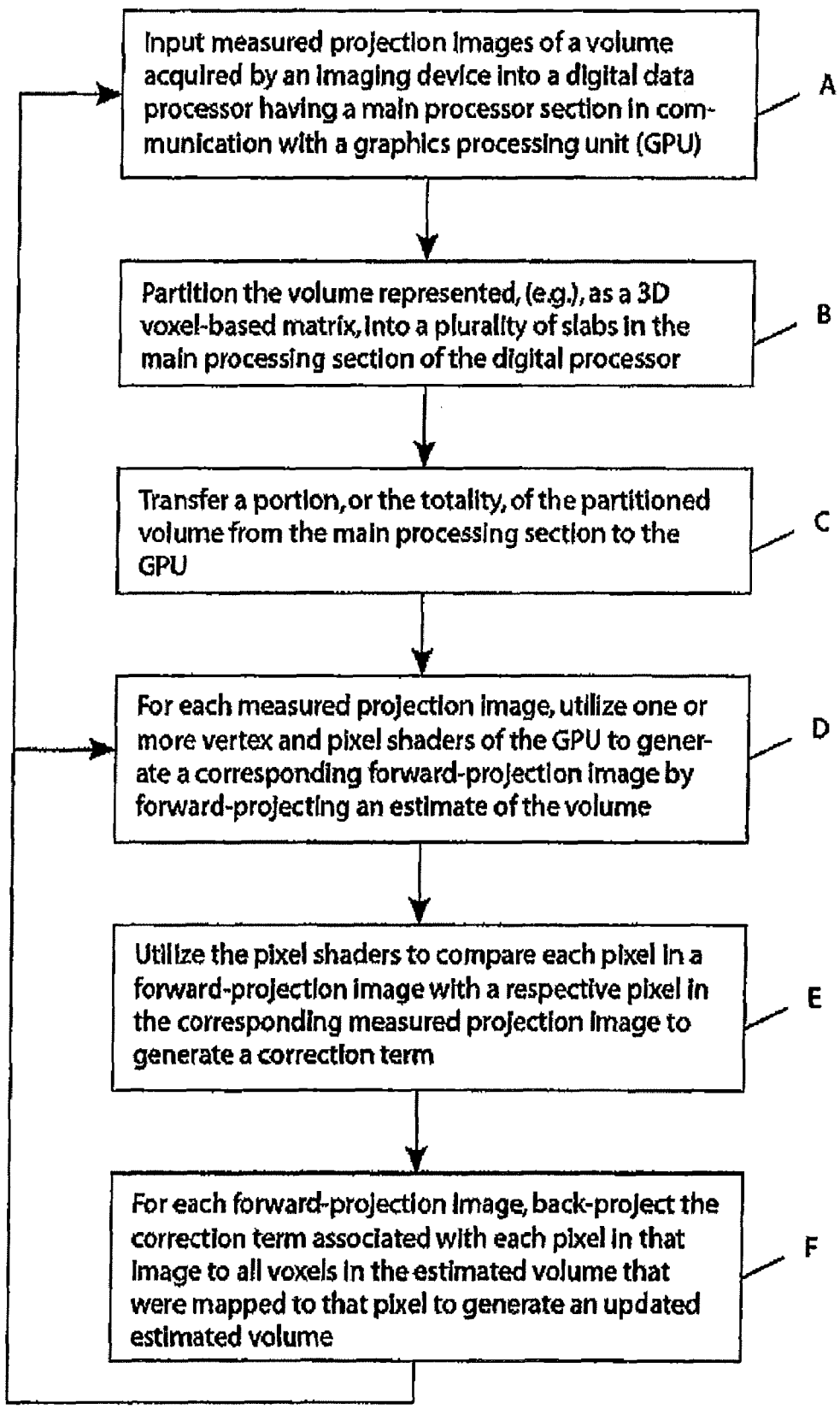
FIG. 3 is a flow chart depicting the steps of a reconstructive imaging method implemented on a GPU in accordance with one exemplary practice of the invention, FIGS. 4A and 4B schematically depict the projection of a slab in a volume under reconstruction onto a detector plane.

The basic steps for reconstruction of the volume 18 are depicted in FIG. 3. In step A, the measured projection images 14 generated by the acquisition device 12 are inputted into the digital data processor 26. This is accomplished in the conventional manner in the art and may comprise inputting all projections 14 after the totality of them has been generated by the apparatus 12, or inputting them individually or in batches while a scan is in progress. The digital data processor also receives from the apparatus 12, and/or from the operator, information regarding the parameters of the acquisition process. This can include patient (or other scanned sample) identity, apparatus calibration data, image acquisition timing, and so forth, as is common in the art. In addition to inputting the projections and foregoing information from the apparatus 12, the digital data processor 26 can serve a user or other interface for controlling the acquisition process in the conventional manner known in the art. Thus, for example, the digital data processor can download initialization parameters to the apparatus 12, or control the initiation and termination of scans performed thereby.

In step B, the digital data processor and, particularly, the CPU 30 partitions the imaged volume, which can be stored as a voxel-based three-dimensional representation in a matrix or other data structures, into a plurality of slabs, e.g., oriented along the z-axis, each of which can comprise multiple slices. The CPU assigns the reconstruction of one or more of the slabs, or that of the entire volume, to the GPU 36. More specifically, in step C, the CPU transfers the necessary data, such as, a subset or the totality of the projection images as well as the voxel-based representation of the volume or a portion thereof, to the GPU. In the following, it is assumed, without any loss of generality, that the reconstruction of the entire volume is assigned to the GPU.

The GPU employs an iterative process involving successive stages of forward-projection of an estimated volume density distribution, error-measurement, back-projection and correction to reconstruct the volume. With each iteration, the estimated density distribution of the volume converges toward to suitable representation of the volume—typically, within ten to twenty iterations, though, this depends on the number of measured projection images, the resolution of the imaging apparatus, the specifics of the iteration alogorithm, among other factors.

With continued reference to FIG. 3, the GPU begins each iteration with generating, for each measured projection image, a hypothetical (synthetic) projection image (herein also referred to as a forward-projection image) by forward-projecting an estimated density distribution of the volume that is generated by a previous iteration (step D). In this illustrated embodiment, the estimated density distribution of the volume is stored in a matrix. For the first iteration, the voxel-based matrix representing the volume is initialized to an arbitrary value, e.g., a zero or a non-zero constant.

More specifically, for each measured projection image, the pixel shaders 60-66 (FIG. 1) generate a corresponding forward-projection image by integrating absorption estimates for voxels of the volume along hypothetical x-ray paths that extend from the source 22 to each pixel in the respective forward projection space. The voxels can be identified by one or more of the vertex shader 80-94 by drawing textured polygons. Typically, the x-ray paths are treated as diverging from a local point source. Alternatively, the paths are treated as if parallel to one another relative to the detector plane, as if the point source were infinitely far from the detector, as discussed in the above-referenced co-pending patent application entitled "Improved Methods and Apparatus for Back-Projection and Forward-Projection." In some embodiments, the pixel shaders generate the forward-projection images in parallel.

Figure 4A:
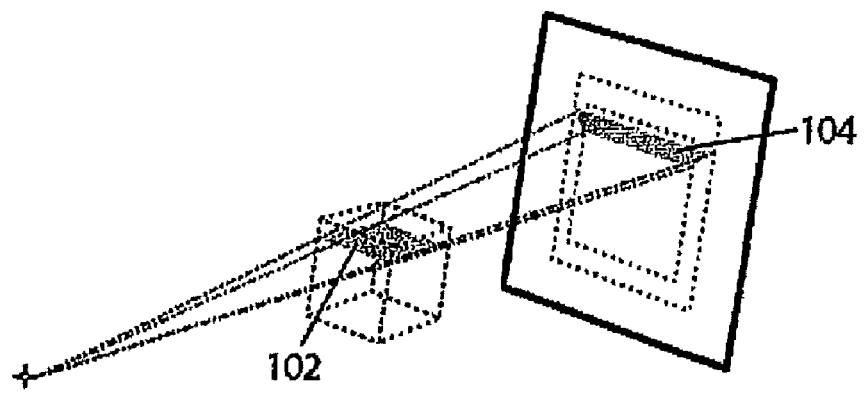
Figure 4B:
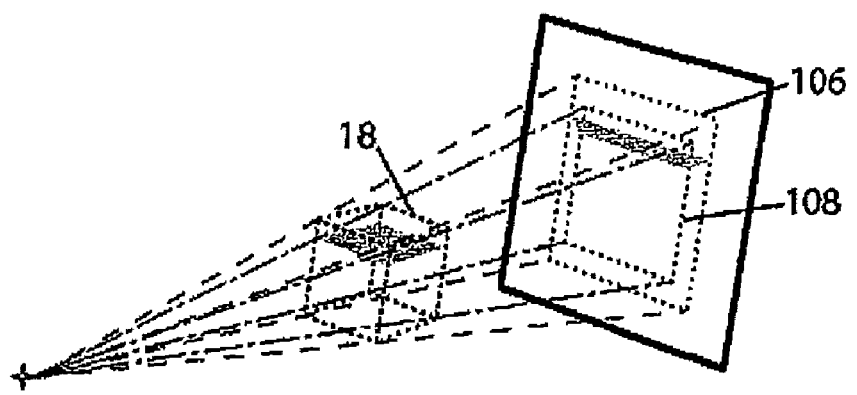

By way of illustration, FIG. 4A depicts the projection of a slab 102 of the estimated volume 18 onto the imaging plane of the detector 22. This represents projection of rays from the imaging source 20 past the corners and edges of slab 102 and to the imaging plane. Likewise, FIG. 4B depicts projection of the edges of volume 18 onto detector 22 by silhouettes 106 and 108. This represents projection of rays from the imaging source 22 past the corners and edges of volume 18 and to the imaging plane of detector 22.

Referring again to FIG. 3, in step E, each of those hypothetical (synthetic) forward-projection images is compared with the respective measured projection image pixel-by-pixel to compute a correction term for each pixel in the forward-projection image. More particularly, one or more of the pixel shaders compute pixel-by-pixel differences between intensities in each of the current hypothetical projection images and those in the respective measured projection images. Those differences themselves, or functions thereof, can represent the correction terms.

In step F, the correction term computed for each pixel in each synthetic projection image is back-projected to those voxels in the volume that were mapped to that pixel in the forward projection. The mappings between the pixels and the respective voxels are beneficially implemented on one or more of the vertex shaders 80-89 by treating each current volume slice, a portion thereof, as the "model" and treating each projection image as a "window" onto which that model is to be projected. The viewpoint for the projection is that of a hypothetical observer disposed at a location opposite the image plane from the x-ray source 20 looking back along a line defined by that source and the center of the imaged volume.

More particularly, for each pixel in a synthetic projection image, one or more of the vertex shaders map a plurality of voxels that lie substantially at vertices of one or more selected polygonal portions of one or more slices of the volume to that pixel. For example, an iterator I associated with a vertex shader iteratively generates coordinates in the volume space (i.e., x, y, z coordinates)—i.e., voxels—that make up the polygon defined by the vertices generated by the that vertex shader. The iterator further passes to the pixel processing section offset or absolute addresses that permit back-projection of the correction terms generated by the pixel processing section to be assigned to the corresponding voxels of the volume stored in the local memory 44.

The filtered elements (F) of the pixel processing section sample each synthetic projection image at the mapped coordinates defined by the iterators, I, to generate filtered synthetic projection image correction data. This can include, e.g., approximating among pixel values specified in the synthetic projection images (e.g., by bilinear approximation or otherwise, anisotropic filtering, or otherwise).

In step F, the pixel shaders 80-94 project back the filtered correction data generated by the filters F onto the estimated density (absorption) distribution assigned to the volume (stored as a matrix in the local 44 in this illustrated embodiment). They do this by back-projecting the correction term associated with each pixel onto all voxels of the volume that were mapped onto that pixel in the forward projection. For example, one or more pixel shaders can be employed to compute a weighted sum of the back-projected corrections and current values of respective voxels representing the volume. The resulting voxel values (i.e., updated density or absorption values) replace the current estimated values of the volume density distribution. The updating of the estimated volume density distribution based on back-projected correction values can be performed slice-by-slice, or alternatively, multiple slices (or their totality) can be processed in parallel.

The above steps A-F are then repeated (in each repetition the updated volume matrix is employed as the starting estimate for the volume) until the estimated volume matrix converges to a sufficiently close approximation of the actual density distribution of the volume—typically within ten to twenty iterations, depending on the number of projection images 14, the resolution of the imaging apparatus, and the specifics of the reconstruction algorithm employed.

The illustrated embodiment preferably optimizes the implementation of the above volume reconstruction method on the GPU by employing one or more of the following features. For example, the partitioning of the volume into 2D slices is preferably such that one or more projection images being processed by the GPU have projection directions that are perpendicular, or substantially perpendicular, to those 2D slices. Otherwise, the volume is reordered with slice-orientations in one of the other two main directions ("volume swapping" is performed).

In order to minimize the number of volume swaps, in some embodiments, the measured projections are divided into two groups based on the angle between the direction of their central ray and the x or y-axes. For the first group, the central ray directions are more parallel to the x-axis (e.g., within a selected cone around the x-axis), and for the second group, the central ray directions are more parallel to the y-axis. All the projections in one group are processed before processing the projections in the other group. Further, within each group, the projections are preferably selected for processing in accordance with a quasi-random sequence that ensures each projection is chosen only once. Alternatively, the projections are processed according to a sequence that maximizes the angular difference between the central rays associated with two successively selected projections (i.e., the angular difference between two successively processed projections is as large as possible), while ensuring that each projection is selected only once. Such sequential processing of the projections can advantageously result in a faster convergence of the above iterative volume reconstruction method, e.g., relative to processing the projections in order of increasing angle of their central rays with respect to the x or y-axes.

Moreover, in some embodiments, the convergence of the iterative reconstruction method is further accelerated by restricting the reconstruction volume to an intersection of the cone beams from all projections, e.g., a sphere. Further, the back-projection of the correction terms can be weighted along the rays with a windowing function. The corresponding weights can be computed in a pixel shader (e.g., a particular pixel shader can be assigned this task) or via a look-up table in a 1-D texture stored in the local GPU memory 44.

In some embodiments, the reconstruction of the volume 18 by the GPU is accelerated by configuring the pixel shaders to compute multiple steps in the forward-projection (and/or back-projection) of each ray before performing similar computations for another ray, thereby minimizing, and preferably avoiding, transfer of data between the GPU and the main processor memory (e.g., the RAM 32). The illustrated embodiment, the full computation of at least one iteration of a volume slice (and preferably the totality of iterations for that slice or for the total volume) is performed on the GPU without any transfer of texture data between the GPU and the main processor memory.

In some embodiments, the implementation of the forward-projections is preferably similar to that of the back-projections. This is achieved, for example, by utilizing a specially designed projection matrix describing an asymmetric view frustum. More specifically, in the forward projection, the origin of the x-ray source (or other radiation or particles sources used in other embodiments) and the four corners of the detector plane define the view frustum. In the backward projection, for each slice of the volume, the origin of the x-ray source and the four corners of that slice define the view frustum. Treating the forward and the back-projections in a similar manner allows the use of the same coordinate system for the slice geometry in both cases. This, in turn, simplifies the reconstruction algorithm compared to previous approaches in which different coordinate systems are employed, thus necessitating application of an additional texture transformation matrix for back projections.

It should be understood that the teachings of the invention are applicable to a wide range of medical (and non-medical) imaging devices and techniques, and are not limited to the illustrated embodiment described above. Those having ordinary skill in the art will appreciate that various modifications can be made to the above illustrative embodiments without departing from the scope of the invention.

What is claimed is:

1. An imaging apparatus, comprising
an image acquisition device for generating a plurality of measured projection images of a volume,
a digital data processor coupled to the acquisition device for receiving the images, the digital data processor comprising a central processing unit (CPU) in communication with a graphics processing unit (GPU) including a plurality of programmable vertex shaders that are coupled to a plurality of programmable pixel shaders,
the CPU transferring at least some of the measured projection images to the GPU,
wherein the GPU reconstructs at least a portion of the volume based on comparison of a plurality of forward-projection images corresponding to successive iterations of an estimated density distribution assigned to that volume portion with one or more of the measured projection images without transfer of intermediate texture data to the CPU.

2. In the apparatus of claim 1, the further improvement wherein the image acquisition device comprises a radiation source for illuminating the volume and at least a detector movable about the volume for detecting at least a portion of the illuminating radiation passing through the volume.

3. In the apparatus of claim 2, the further improvement wherein one or more pixel shaders generate each forward-projection image by employing a projection matrix representing an asymmetric view frustum.

4. In the apparatus of claim 3, the further improvement wherein the view frustum is defined by the origin of the radiation source and four corners of a plane of the detector.

5. In the apparatus of claim 1, the further improvement wherein the volume portion comprises an intersection of cone beams corresponding to the measured projection images.

6. In the apparatus of claim 1, the further improvement wherein the GPU classifies the measured projection images into two groups characterized by substantially orthogonal projection directions.

7. In the apparatus of claim 6, the further improvement wherein the GPU processes the projection images in one group prior to processing the projection images in the other group.

8. In the apparatus of claim 1, the further improvement wherein the CPU represents the volume as a voxel-based three-dimensional matrix.

9. In the apparatus of claim 6, the further improvement wherein the CPU partitions the volume into a plurality of slices.

10. In the apparatus of claim 9, the further improvement wherein one or more of the vertex shaders map, for each forward-projection image, a plurality of voxels that lie substantially at vertices of one or more selected polygonal portions of one of the slices to a respective pixel in that forward-projection image.

11. In an apparatus comprising a main processing section and a graphics coprocessing section including a plurality of programmable vertex shaders that are coupled to a plurality of programmable pixel shaders, a method for reconstructing a volume from a plurality of measured projection images, the improvement comprising:
transferring the projection images from the main processing section to the graphics coprocessing section, and
iteratively reconstructing the volume in the graphics coprocesssing section based on comparison of a plurality of forward-projection images corresponding to successive iterations of an estimated density distribution assigned to that volume with the measured projection images without transfer of intermediate texture data between the graphics coprocessing section and the main processing section.

12. In the method of claim 11, the further improvement comprising partitioning the volume into a plurality of slices in the main processing section.

13. In the method of claim 12, the further improvement comprising:
for generating each forward-projection image, performing the steps of:
with one or more of the vertex shaders, mapping a plurality of voxels that substantially lie at vertices of selected polygonal sections of one or more of the slices to a respective pixel of that forward-projection image, and
with one or more of the pixel shaders, generating an intensity for each pixel in the forward-projection image by forward projecting the voxels mapped to that pixel.

* * * * *